United States Patent
Li et al.

(10) Patent No.: US 9,219,410 B2
(45) Date of Patent: Dec. 22, 2015

(54) CHARGE PUMP SUPPLY WITH CLOCK PHASE INTERPOLATION

(75) Inventors: Jipeng Li, Windham, NH (US); Richard E. Schreier, Toronto (CA)

(73) Assignee: ANALOG DEVICES, INC., Norwood, MA (US)

( * ) Notice: Subject to any disclaimer, the term of this patent is extended or adjusted under 35 U.S.C. 154(b) by 587 days.

(21) Appl. No.: 13/617,548

(22) Filed: Sep. 14, 2012

(65) Prior Publication Data

US 2014/0078795 A1  Mar. 20, 2014

(51) Int. Cl.
  *G05F 1/10* (2006.01)
  *G05F 3/02* (2006.01)
  *H02M 3/07* (2006.01)

(52) U.S. Cl.
  CPC ........ *H02M 3/073* (2013.01); *H02M 2003/077* (2013.01)

(58) Field of Classification Search
  CPC .................. H02M 2003/077; H02M 3/073
  USPC .......... 327/147–150, 156–159, 161, 536, 589
  See application file for complete search history.

(56) References Cited

U.S. PATENT DOCUMENTS

| | | | |
|---|---|---|---|
| 5,642,073 A | 6/1997 | Manning | |
| 5,680,300 A | 10/1997 | Szepesi et al. | |
| 5,959,854 A | 9/1999 | Okada | |
| 7,151,413 B2 | 12/2006 | Lin | |
| 7,173,478 B2 * | 2/2007 | Chun | 327/536 |
| 7,567,118 B2 | 7/2009 | Azuma et al. | |
| 7,596,173 B2 | 9/2009 | Ishida et al. | |
| 7,737,765 B2 | 6/2010 | Tran et al. | |
| 8,508,287 B2 | 8/2013 | Kern et al. | |
| 8,829,980 B2 | 9/2014 | Siragusa et al. | |
| 2002/0171496 A1 | 11/2002 | Jordan et al. | |

(Continued)

FOREIGN PATENT DOCUMENTS

| | | |
|---|---|---|
| CN | 1677512 A | 10/2005 |
| EP | 2296276 A2 | 3/2011 |
| TW | I256197 B | 6/2006 |
| TW | 200635229 | 10/2006 |

OTHER PUBLICATIONS

Dongsheng Ma, "Robust Multiple-Phase Switched-Capacitor DC-DC Converter with Digital Interleaving Regulation Scheme", Proceedings of the 2006 International Symposium on Low Power Electronics and Design, pp. 400-405, ISLPED'06, Oct. 4-6, 2006.

(Continued)

*Primary Examiner* — Hai L Nguyen
(74) *Attorney, Agent, or Firm* — Kenyon & Kenyon LLP

(57) ABSTRACT

A voltage generator may include a plurality of charge pumps, plural sets of delay pipelines and a phase controller. Given M delay pipelines having N stages each, there may be M*N charge pumps each having a triggering input coupled to a respective stage or a respective pipeline. The phase controller may include a plurality of phase control stages interconnecting among the delay pipelines to induce timing offsets among the outputs of the delay stage. In an alternate design, intermediate nodes among the pipeline's delay stages may be coupled to triggering inputs of a sub-set of the charge pumps. The phase controller may have a plurality of phase control stages coupled, respectively, between the intermediate nodes of the delay pipeline and intermediate nodes of the phase control stages may be coupled to triggering inputs of another sub-set of the charge pumps.

23 Claims, 7 Drawing Sheets

(56) References Cited

U.S. PATENT DOCUMENTS

| | | |
|---|---|---|
| 2004/0051579 A1 | 3/2004 | Hausmann et al. |
| 2005/0046498 A1 | 3/2005 | Nishiyama |
| 2005/0206425 A1 | 9/2005 | Shutoku et al. |
| 2010/0013548 A1 | 1/2010 | Barrow |
| 2010/0052771 A1 | 3/2010 | Hartono |
| 2010/0166229 A1 | 7/2010 | Pennock et al. |
| 2012/0242401 A1 | 9/2012 | Siragusa et al. |

OTHER PUBLICATIONS

U.S. Appl. No. 13/214,904, filed Aug. 22, 2011 (Siragusa et al.).
International Search Report and Written Opinion of the International Searching Authority in counterpart International application No. PCT/US2012/029915, communication dated Jul. 9, 2012.
TW Office Action issued in TW Appln. No. 102131098, dated Nov. 26, 2014, 7 pages (with EN translation).

* cited by examiner

100

200

300

400

600

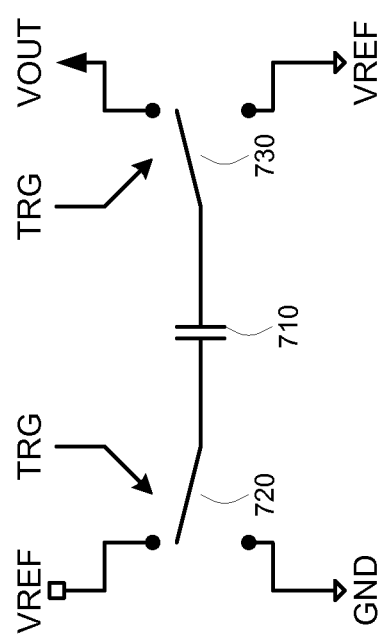

CHARGE PUMP SUPPLY WITH CLOCK PHASE INTERPOLATION

BACKGROUND

In modern integrated circuit (IC) designs, there often is a requirement to generate voltage levels above available supply voltages ($V_{DD}$) or below ground. For this purpose, voltage generators are built from charge pumps. A charge pump typically precharges a capacitor to the available supply voltage $V_{DD}$, then either pushes the capacitor's low potential side to $V_{DD}$ or its high potential plate to GND to create a boosted voltage at an output node (either $2*V_{DD}$ or $-V_{DD}$). In practical application, multiple charge pump cells, having a common size, usually are coupled to the output node to meet an estimated load current that will cause the boosted voltage to drain. These charge pump cells usually are controlled by a single clock source. The voltage at the output node may include a "ripple" effect as the charge pumps inject charge to the output node at the clocked rate and as load devices drain current from the output node.

In a clocked charge pump design, the voltage ripple may have a fundamental frequency based on the clock source and a magnitude proportional to:

$$I_{LOAD}*T_{CLK}/C_{LOAD}, \quad (Eq. 1)$$

where $I_{LOAD}$ represents a drain current from the output node, $C_{LOAD}$ represents a capacitance of a load device and $T_{CLK}$ represents a period of a driving clock. In certain applications, a significant voltage ripple can cause chip malfunction or significantly reduce a circuit's performance. For high performance applications, for example, often a large decoupling capacitor must be added to an output of the charge-pump output to reduce the ripple. Sometimes, a linear low drop-out regulator is required to reduce ripple further. However, there is a cost associated with these techniques: large decoupling capacitors can consume considerable chip area and the drop out associated with a linear regulator can make it unsuitable for certain low voltage applications. Another way to reduce ripple would be to reduce clock period, but there are many other constraints on choosing clock frequency which makes this method less practical.

U.S. patent application Ser. No. 13/214,904, assigned to the assignee of the present invention, the disclosure of which is incorporated herein, describes a scheme which multiple clock stages of a ring oscillator or delay line drive respective charge pumps. Transitions of each charge pump are offset from the others due to the delays associated with each element in the delay line. Therefore, for a common number N of charge pumps, the voltage drop rate can be reduced by N/2. Another benefit is that the fundamental frequency of voltage ripple is N/2 times of the clock frequency and it is limited only by the delay inherent in an inverter pair of the ring oscillator. This scheme yields significant improvement on ripple reduction compared to a single clock phase driving scheme. However, the design is limited by the unit delay in the delay chain and may not be sufficient for some applications.

Accordingly, the inventors perceive a need in the art that further reduces the effects of ripples in multi-stage charge pump voltage generators.

BRIEF DESCRIPTION OF THE DRAWINGS

FIG. 7 is a circuit diagram of a charge pump according to an embodiment of the present invention.

DETAILED DESCRIPTION

Embodiments of the present invention provide a voltage generator that includes a plurality of charge pumps, plural sets of delay pipelines and a phase controller. The delay pipelines may be constructed similarly to each other and may have a predetermined number of delay stages. Given M delay pipelines having N stages each, there may be M*N charge pumps each having a triggering input coupled to a respective stage or a respective pipeline. The phase controller may include a plurality of phase control stages interconnected among the delay pipelines to induce timing offsets among the outputs of the delay stages. As compared to single pipeline designs in which a single charge pump may have been triggered within a unit delay defined by the pipeline's delay architecture, the present design may cause M charge pumps to be triggered within the same unit delay but to be offset from each other. In this manner, the voltage generator may reduce ripple effects of prior designs.

An alternate design may provide a voltage generator that includes a predetermined number of charge pumps, a delay pipeline having a predetermined number of delay stages and a phase controller. In this alternate design, intermediate nodes among the pipeline's delay stages may be coupled to triggering inputs of a sub-set of the charge pumps. The phase controller may have a plurality of phase control stages coupled, respectively, between the intermediate nodes of the delay pipeline and intermediate nodes of the phase control stages which may be coupled to triggering inputs of another sub-set of the charge pumps. Again, as compared to single pipeline designs in which a single charge pump may have been triggered within a unit delay defined by the pipeline's delay architecture, the present design may cause a pair of charge pumps to be triggered within the same unit delay but to be offset from each other. In this manner, the voltage generator may reduce ripple effects of prior designs.

Figure 1:
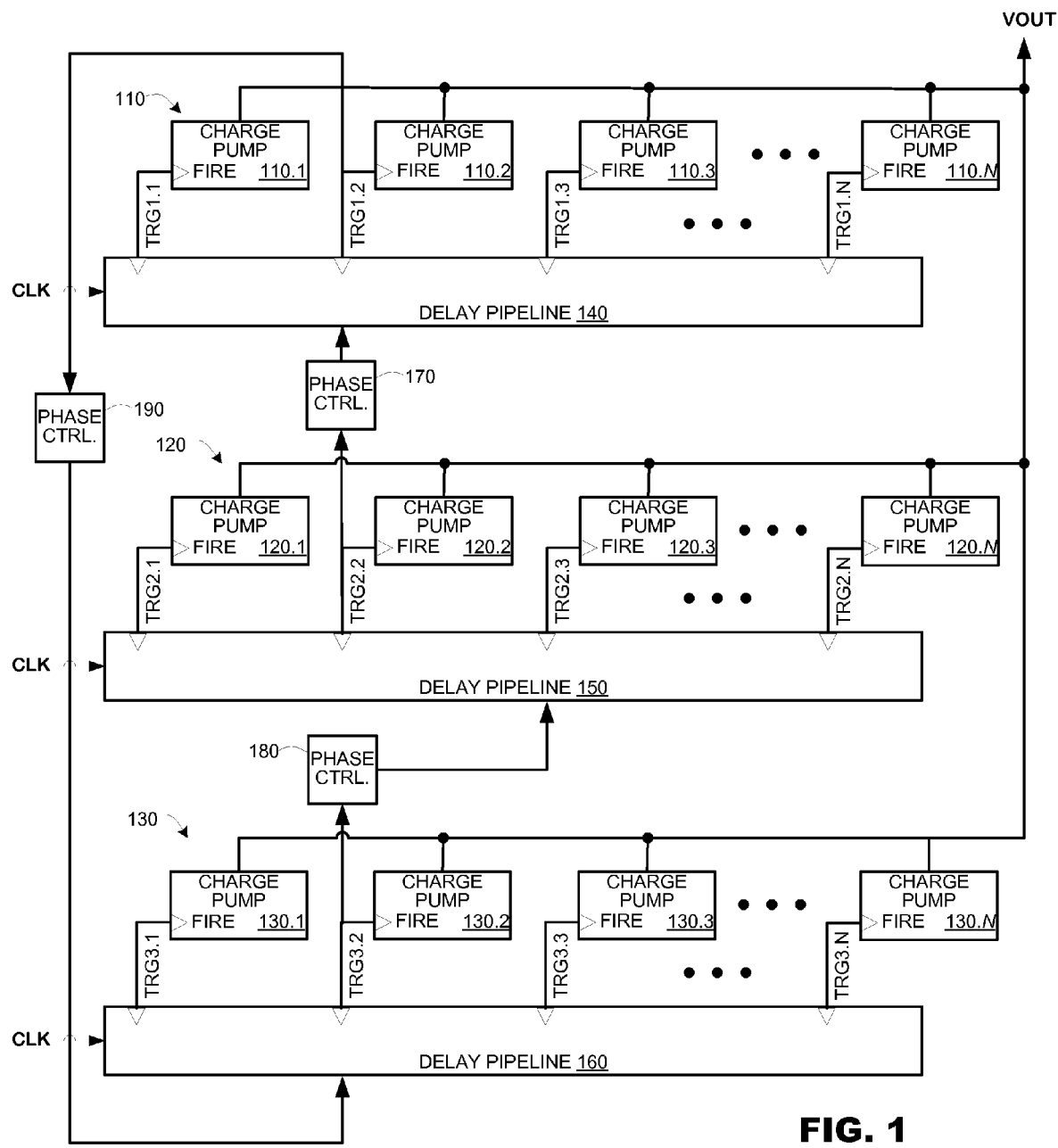
FIG. 1 is a functional block diagram of a voltage generator according to an embodiment of the present invention.

FIG. 1 is a functional block diagram of a voltage generator 100 according to an embodiment of the present invention. The voltage generator 100 may include several arrays 110-130 of charge pumps, several delay pipelines 140-160 and a phase controller formed by phase control stages 170, 180 and 190. Each array 110, 120, 130 may include a common number N of charge pumps 110.1-110.N, 120.1-120.N, 130.1-130.N, each having an input (shown as "FIRE") for a respective control signal. Control signals TRG1.1-TRG1.N, TRG2.1-TRG2.N, TRG3.1-TRG3.N for each charge pump 110.1-110.N, 120.1-120.N and 130.1-130.N may be taken from corresponding locations of their associated delay pipelines 140, 150, 160.

Thus, control signals TRG1.1-TRG1.N for the charge pumps 110.1-110.N may be taken from the delay pipeline 140, control signals TRG2.1-TRG2.N for the charge pumps 120.1-120.N may be taken from the delay pipeline 150 and so on. Outputs of the charge pumps 110.1-110.N, 120.1-120.N, 130.1-130.N may be coupled to a common output terminal $V_{OUT}$ of the voltage generator 100.

The delay pipelines 140, 150, 160 may have similar architectures to each other and may be made of common types of components. The control signals TRG1.1-TRG1.N may be taken from common locations within a first delay pipeline 140 as their counterparts TRG2.1-TRG2.N, TRG3.1-TRG3.N, etc. are taken from the other delay pipelines 150, 160. Thus, if the delay pipelines 140, 150, 160 were to receive a common input signal and absent contribution of the phase controller (and any process variations among the components), the control signals TRG1.1-TRG1.N of the first delay pipeline 140 would be phase aligned with counterpart control signals TRG2.1-TRG2.N, TRG3.1-TRG3.N from the other delay pipelines 150, 160.

The phase controller may be coupled among the delay pipelines 140-160 to introduce phase offsets among the control signals TRG1.1-TRG1.N, TRG2.1-TRG2.N, TRG3.1-TRG3.N, etc. Couplings of the phase control stages 170-190 to the delay pipelines 140-160 may form a "ring" among the delay pipelines 140-160. In the embodiment illustrated in FIG. 1, for example, the delay pipeline 150 is shown as coupled to delay pipeline 140 by a first phase control stage 170, delay pipeline 160 is coupled to delay pipeline 150 by a second phase control stage 180 and delay pipeline 140 is coupled to delay pipeline 160 by a third phase control stage 190.

The phase control stages 170, 180, 190 may have inputs coupled to control signal outputs at a common location among the delay pipelines 140, 150, 160. For example, in the embodiment illustrated in FIG. 1, the phase control stages 170, 180, 190 have inputs coupled to the control signals TRG2.2, TRG3.2 and TRG1.2 respectively, which may be taken from second stages (not shown) within each delay pipeline 140, 150, 160. Outputs of the phase control stages 170, 180, 190 may be coupled to various stages of an adjacent pipeline. One of the phase control stages may have an output coupled to a stage of another delay pipeline that differs from its input stage. The other phase control stages may have its outputs coupled to a pipeline stage that matches the stage of its input. Thus, in the example of FIG. 1, the phase control stage 180 has its input coupled to the TRG3.2 output, which corresponds to a second stage (not shown) in the delay pipeline 160, but it has its output coupled to a third stage (also not shown) in delay pipeline 150. The other phase control stages 170, 190 are shown having their outputs coupled to the second stage of their respective delay pipeline 140, 160.

FIG. 1 illustrates a phase controller provided as a single ring of phase control stages 170-190. Other embodiments of the present invention, discussed below, may include additional phase control stages (not shown) that couple among different stages of the delay pipelines 140-160. Indeed, in some embodiments, the phase controller may include a web of phase control stages that couple each stage of a delay pipeline to stages of two other neighboring delay pipelines. Such embodiments have been omitted from FIG. 1 so as not to introduce clutter into the figure but they are presented in other figures herein.

Embodiments of the present invention accommodate different architectures of delay pipelines 140-160. In a first embodiment, for example, the delay pipelines 140-160 may have their inputs coupled to a common clock signal CLK. The delay pipelines may include a series of buffers provided in series. In another embodiment, the delay pipelines 140-160 may be provided as ring oscillators that self-generate their own clocks.

The example of FIG. 1 illustrates three sets of charge pump arrays 110-130 and delay pipelines 140-160 but the principles of the present invention may be extended to an arbitrary number M of charge pump arrays and delay pipelines, where M≥3. Thus, a voltage generator 100 of the present invention may accommodate M sets of charge pump arrays and delay pipelines with N charge pumps and delay stages provided within each set. As part of implementation, circuit designers may select appropriate numbers of M and N to suit their design needs.

Figure 2:
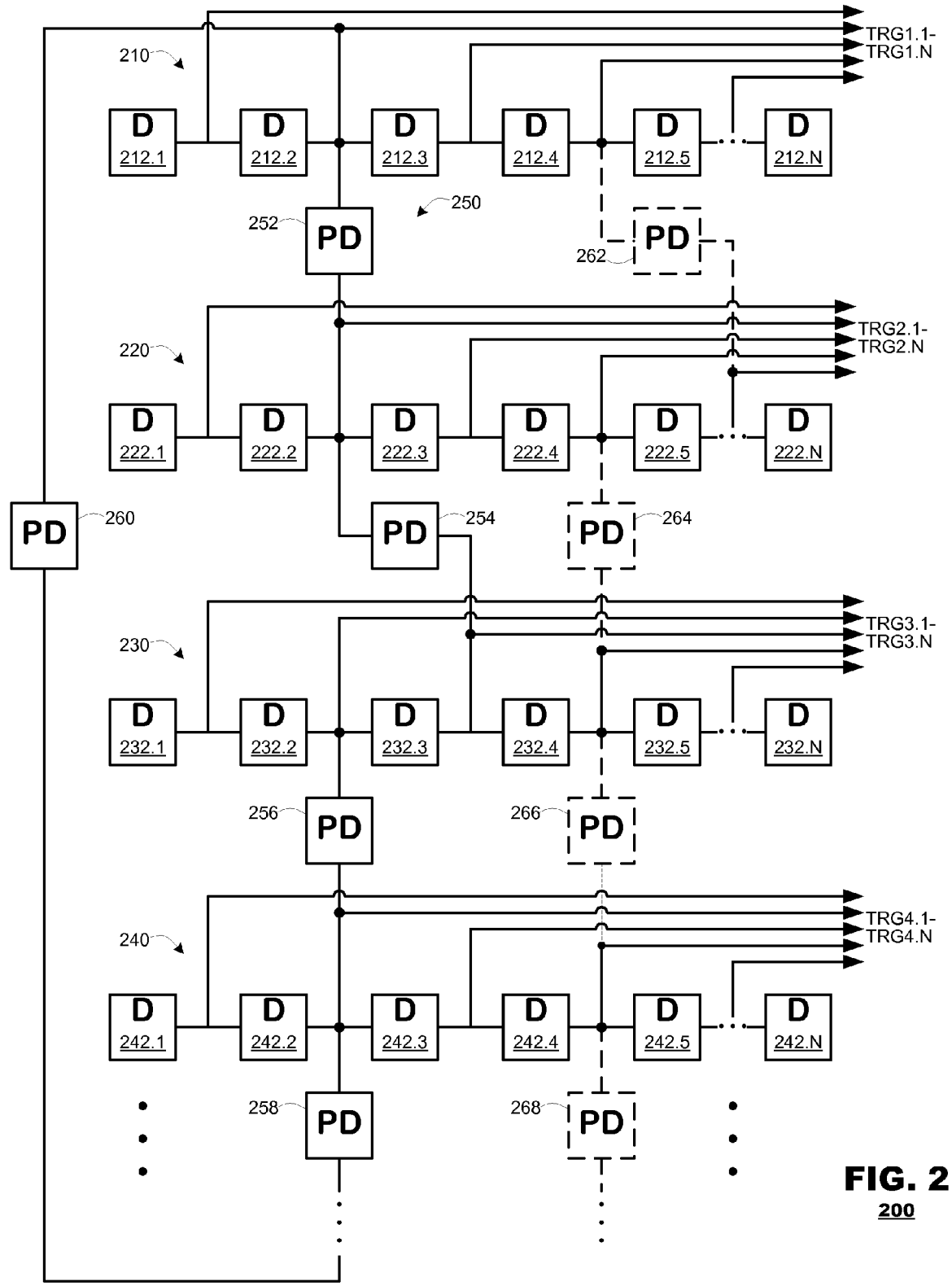
FIG. 2 is a simplified block diagram illustrating relationships among delay pipelines and phase control stages according to an embodiment of the present invention.

FIG. 2 is a simplified block diagram illustrating relationships among delay pipelines and phase control stages according to an embodiment of the present invention. The delay pipelines 210, 220, etc. each may include a plurality of delay stages 212.1-212.N, 222.1-222.N, etc. coupled in series. Outputs TRG1.1-TRG1.N, TRG2.1-TRG2.N, etc. of the delay pipelines 210, 220, etc. may be taken from intermediate nodes between the delay stages 212.1-212.N, 222.1-222.N, etc.

The phase controller 250 may include a plurality of phase control stages 252-260 that form a ring among the delay stages. In this example, as in FIG. 1, inputs of the phase control stages 252-260 each may be connected to an input of a third delay stage 212.3, 222.3, 232.3, 242.3, etc. of the respective delay pipelines 210-240. An output of one of the phase control stages 254 may be connected to an input of a pipeline stage different from the stage to which its input is connected (an input of the fourth pipeline stage 232.4 in the example of FIG. 2). Outputs of the other phase control stages 252, 256-260 may be coupled to inputs of pipeline stages 212.3, 222.3, 242.3 at the same level at which its inputs are connected (e.g., inputs and outputs of the phase control stages are coupled to inputs of the third pipeline stages).

The phase controller may include additional phase control stages and connections among the pipelines 210-240. FIG. 2 illustrates, in phantom, additional phase control stages 262-268 that may form a second ring among the pipelines 210-240. As with the first ring, the second phase control stages 262-268 each may have their inputs and outputs coupled to the delay pipelines 210-240 at a common depth within each pipeline with the exception that an output of one of the phase control stages (stage 262 in the example of FIG. 2) may have its output coupled to an input of another stage in the pipeline 220 at a level that differs from the stage 212.5 to which its input is connected in another pipeline 210.

Figure 3:
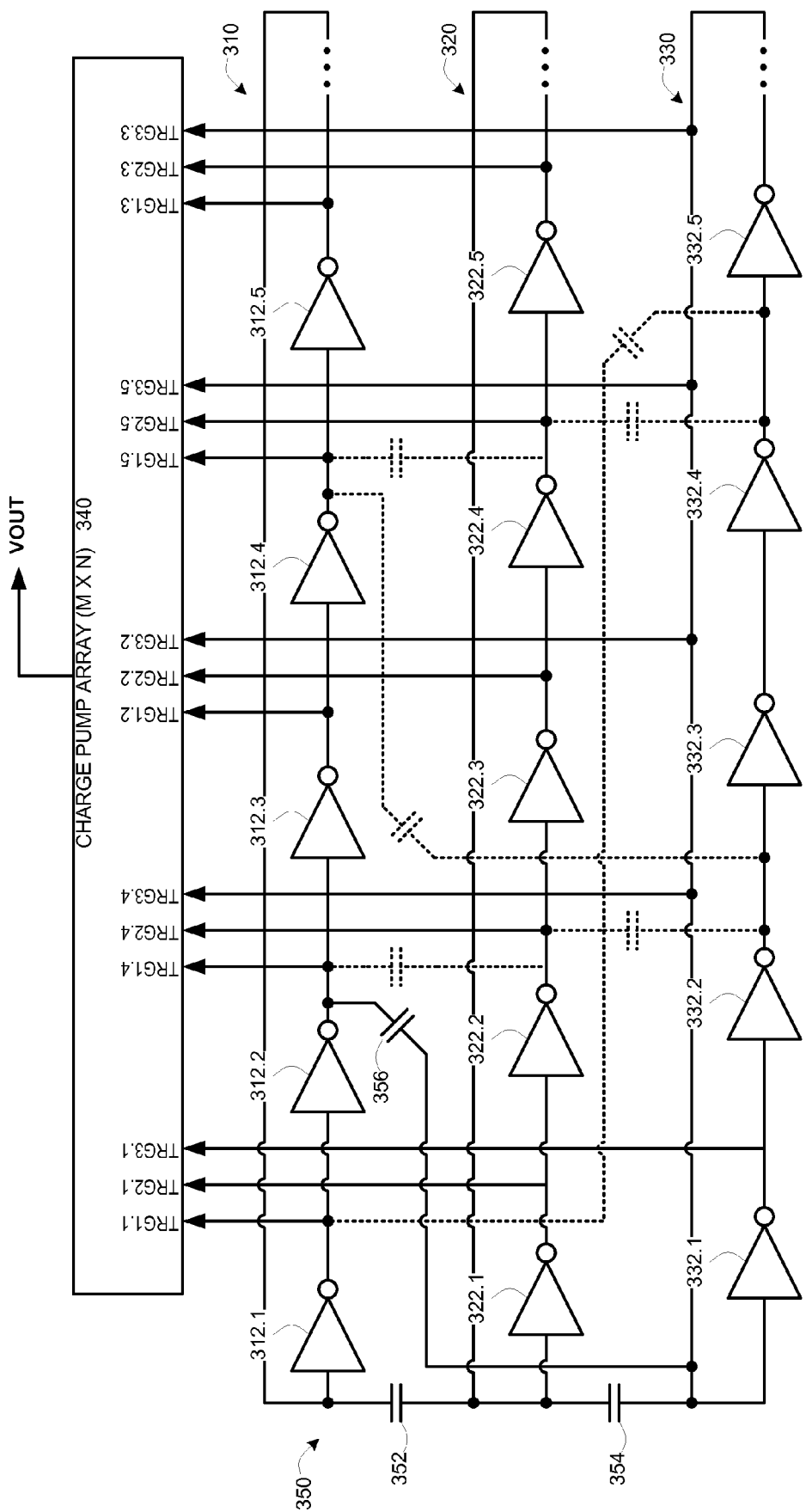
FIG. 3 illustrates a voltage generator according to another embodiment of the present invention.

FIG. 3 illustrates a voltage generator 300 according to another embodiment of the present invention. In this embodiment, the voltage generator 300 is shown as including several delay pipelines 310-330, an associated charge pump array 340 and a phase controller 350. The charge pump array 340 may be an M×N array of charge pump stages (not shown individually in FIG. 3), in which M represents the number of delay pipelines 310-330 and N represents the number of stages in each delay pipeline 310-330.

In the embodiment of FIG. 3, the delay pipelines 310-330 are provided as ring oscillators. Each ring oscillator 310, 320, 330 may have an odd number of inverter stages 312.1-312.5, 322.1-322.5 and 332.1-332.5 provided coupled in series in a ring. Trigger signals TRG1.1-TRG1.5, TRG2.1-TRG2.5 and TRG3.1-TRG3.N5 for the charge pump array 340 may be taken from intermediate nodes that occur between the inverter stages 312.1-312.5, 322.1-322.5 and 332.1-332.5. The inverters 312.1, 312.3, 312.5, etc., in odd-numbered positions of the delay pipelines may generate outputs corresponding to a first subset of the trigger signals TRG1.1-TRG1.3 and the inverter 312.2, 312.4 in even-numbered positions of the delay pipelines may generate outputs corresponding to a remainder of the trigger signals TRG1.4-TRG1.5.

The phase controller 350 is shown as including a plurality of capacitors 352-356 that are interconnected among the ring oscillators 310-330. In the embodiment illustrated in FIG. 3, the capacitors 352-356 are coupled to inputs of the first stage of inverters 312.1, 322.1, 332.1 among the ring oscillators with one exception. Here, a terminal of one capacitor 356 is coupled to an input of another stage 312.3 of one of the ring oscillators.

During operation, each ring oscillator 310, 320, 330 self-generates a clock signal that propagates through each oscillator's inverters. Taking ring oscillator 310 as an example, an inverter 312.1 may generate a rising edge signal at its output, which would cause a charge pump (not shown individually in array 340) associated with the TRG1.1 output to fire. The rising edge signal from inverter 312.1 may be inverted by inverter 312.2 and may be inverted again by inverter 312.3. When the inverter 312.3 generates a rising edge signal, it may cause a charge pump (again, not shown individually) associated with the TRG1.2 output to fire. The rising edge signal from inverter 312.3 may be inverted by inverter 312.4 and may be inverted again by inverter 312.5, which may generate a rising edge signal that causes a charge pump associated with the TRG 1.3 output to fire.

The rising edge signal from inverter 312.5 may propagate back to inverter 312.1, which may generate a falling edge signal. Inverter 312.2 may generate a rising edge signal from the inverter's 312.1 output, which may cause a charge pump associated with the TRG 1.4 output to fire. The rising edge signal from inverter 312.2 may be inverted by inverter 312.3 and may be inverted again by inverter 312.4, which may generate a rising edge signal that causes a charge pump associated with the TRG 1.5 output to fire. Thus, the ring oscillator 310 generates a "wave" of rising and falling transitions that loop through the inverters 312.1-312.5 of the ring and generate trigger signal outputs TRG1.1-TRG1.5, which may be output to the charge pump array 340. Operation of the ring oscillators 320-330 may operate in a similar manner as operation of the first ring oscillator 310.

Timing of the trigger signals TRG1.1-TRG1.5, TRG2.1-TRG2.5, TRG3.1-TRG3.5 from the ring oscillators 310-330 may be determined by propagation delays of signals through the inverters 312.1-312.5 and by contribution of the phase controller 350. In the embodiment of FIG. 1, when a voltage on a first terminal of cross-connected capacitor 356 transitions, it may force a corresponding voltage transition on a second terminal of the capacitor 356. Thus, if a voltage transition occurs at an input of inverter 332.1 in one ring oscillator 330, the capacitor 356 may drive a corresponding transition to the input of inverter 312.3 in an adjacent ring oscillator 310. When a transition occurs at the input of inverter 312.1 in ring oscillator 310, the capacitor 352 may drive a corresponding transition to the input of inverter 322.1 in ring oscillator 320. Similarly, when a transition occurs at the input of inverter 322.1 in ring oscillator 320, the capacitor 354 may drive a corresponding transition to the input of inverter 332.1 in ring oscillator 330.

At steady state operating conditions, the ring oscillators 310-330 are expected to generate trigger signals TRG1.1-TRG1.5, TRG2.1-TRG2.5, TRG3.1-TRG3.5 that are more tightly packed than would be possible by a single ring oscillator. In a single ring oscillator, the time between a pair of successive trigger signals would be defined by a propagation delay D between a pair of inverters, for example, inverters 312.2 and 312.3 of ring oscillator 310, which will be a predetermined minimum time that is determined by process, voltage and temperature conditions that govern when the ring oscillator 310 is operating. Use of an array of parallel ring oscillators 310-330, however, that are interconnected by a phase controller 350 may cause each of the ring oscillators 310-330 to generate trigger signals that have a common delay characteristic but are phase offset from each other by a time PD that is less than the D of the transitions in a single ring oscillator. Thus, if a single ring oscillator 310 generates a single trigger signal in a period D, an array of M ring oscillators 310-330 may generate M trigger signals in that same period D. Each ring oscillator 310, 320, 330 may generate a single trigger signal during the period D but the trigger signals are phase offset from each other. Thus, M charge pumps (not shown) may fire within the period D, which contributes to greater control of the output voltage $V_{OUT}$.

In other embodiments, the phase controller 350 may include several sets of capacitors (shown in phantom) that are interconnected among different stages of the ring oscillators 310-330. FIG. 3 illustrates an embodiment where the phase controller 350 provides a web of interconnections, where every three of five inverters (roughly, half) have their inputs coupled respectively to the inputs of inverters from two adjacent ring oscillators via capacitors. Other embodiments may employ different numbers of connections. For example, other embodiments may provide coupling capacitors to interconnect the input of every inverter to inverters of a pair of adjacent ring oscillators. Other variant may couple other fraction of the inverters (e.g., a third, a quarter, etc.) to inverters of the other ring oscillators.

Figure 4:
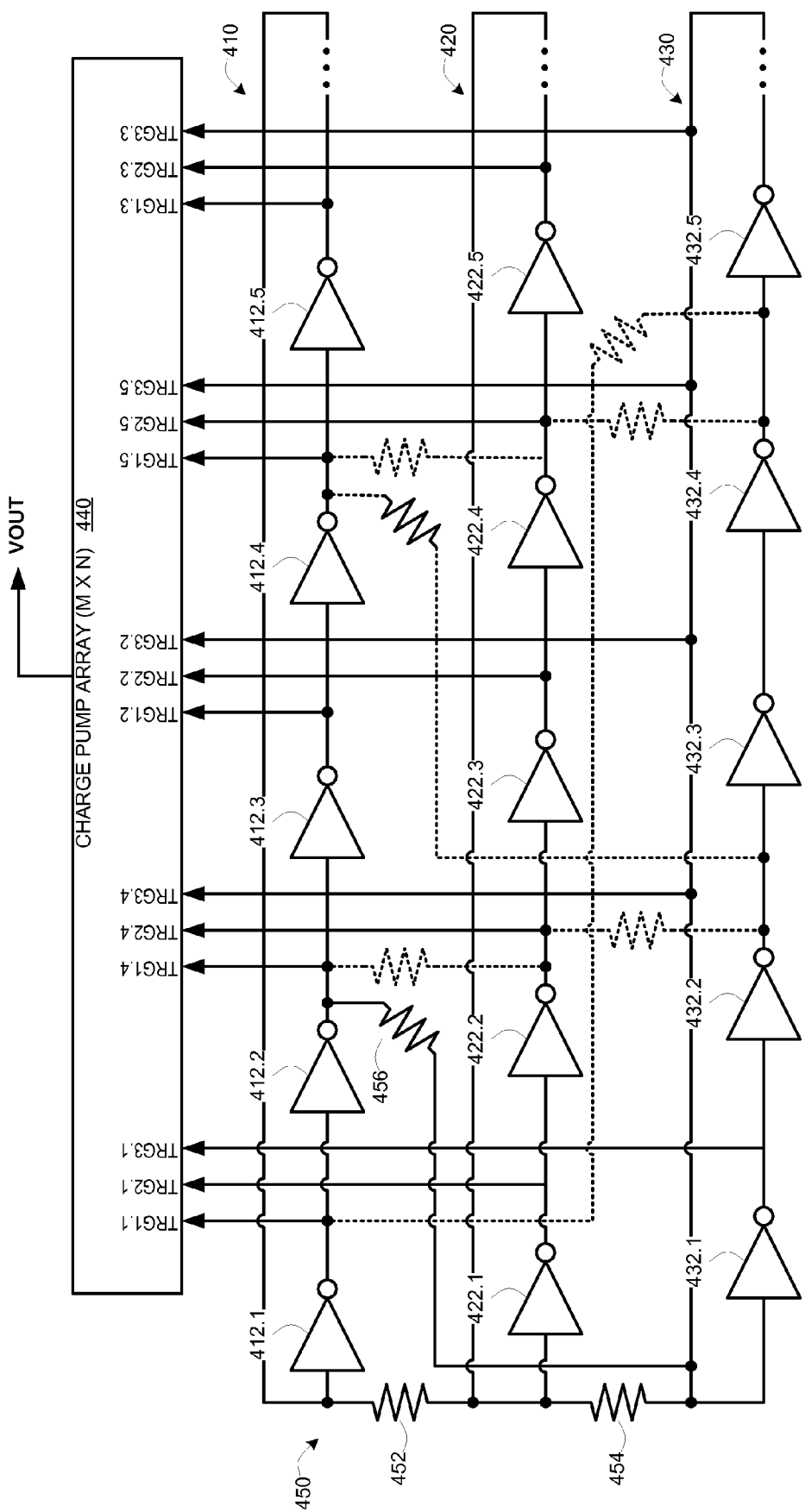
FIG. 4 illustrates a voltage generator according to a further embodiment of the present invention.

In other embodiments, the phase controller may be composed of other types of delay elements. For example, phase controllers may be composed of inverters and resistors. FIG. 4 illustrates a voltage generator 400 according to another embodiment of the present invention in which a phase controller 450 is composed of resistors 452-456 connected in a ring among stages of a plurality of ring oscillators 410-430. In this example, the voltage generator 400 has an architecture similar to that of FIG. 3 in which ring oscillators 410-430 each have inverters 412.1-412.5, 422.1-422.5, 432.1-432.5 that generate trigger signals TRG1.1-TRG1.5, TRG2.1-TRG2.5, TRG3.1-TRG3.5 to a charge pump array 440. The phase controller 450 may impose phase offsets between trigger signals among the ring oscillators 410-430 such that each ring oscillator generates a trigger signal within the delay period of a pair of inverters that are offset from each other by a time determined by the phase controller 450.

As indicated, the phase controller 450 may include a plurality of resistors 452-456 that are interconnected among the ring oscillators 410-430. In the embodiment illustrated in FIG. 4, the resistors 452-456 are coupled to inputs of the first stage of inverters 412.1, 422.1, 432.1 among the ring oscillators with one exception. Here, an output terminal of one resistor 456 may be coupled to an input of a different stage 412.2 of its associated ring oscillator 410.

FIG. 4 also illustrates another embodiment, in phantom, which may include a web of resistors interconnecting stages of the various ring oscillators 410-430. As in the prior embodiments, the present invention accommodates variety in the implementation of such a web. A web may interconnect inputs of every inverter to a pair of neighboring ring oscillators or it may connect input of some fraction of inverters (e.g., half, a third or a quarter of the inverters) to the neighboring ring oscillators.

Figure 5:
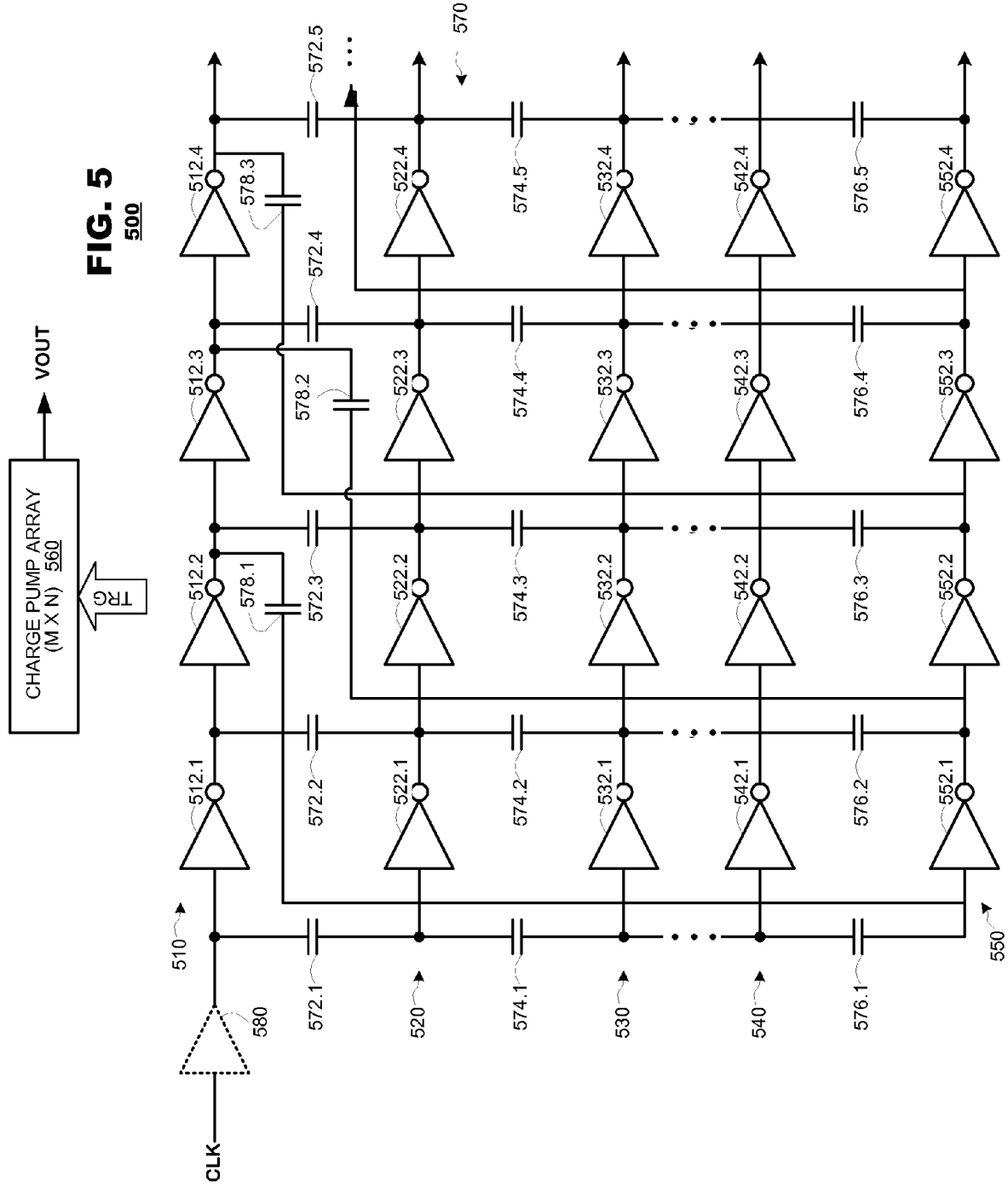
FIG. 5 illustrates a voltage generator according to another embodiment of the present invention.

FIG. 5 illustrates a voltage generator 500 according to another embodiment of the present invention. The voltage generator 500 may accept a driving clock signal CLK from an external source. In this embodiment, the voltage generator 500 may include several delay pipelines 510-550, an associated charge pump array 560 and a phase controller 570. The charge pump array 560 may be an M×N array of charge pump stages (not shown individually in FIG. 5), in which M represents the number of delay pipelines 510-550 and N represents the number of stages in each delay pipeline 510-550.

In the embodiment of FIG. 5, the delay pipelines 510-550 may be provided as chains of inverters connected in series. Each delay chain 510-550 may have an arbitrary number N of inverter stages 512.1-512.4, 522.1-522.4, ..., 552.1-552.4. Trigger signals (not shown individually) may be taken from intermediate nodes that occur between the inverter stages 512.1-512.4, 522.1-522.4, ..., 552.1-552.4. The inverters 512.1, 512.3, etc. in odd-numbered positions of the chains 510-550 may generate outputs corresponding to a first subset of the trigger signals and the inverters 512.2, 512.4, etc. in even-numbered positions of the delay pipelines may generate outputs corresponding to a remainder of the trigger signals.

The phase controller 570 may include a plurality of interconnecting capacitors 572.1-572.5, 574.2-574.5, 576.1-576.5, 578.1-578.3. The CLK signal may be input directly to a first delay chain 510 of the voltage generator 500. Input nodes of the remaining delay chains 520-540 may be coupled to the CLK input via the interconnecting capacitors 572.1, 574.1, 576.1, etc.

FIG. 5 illustrates a web of capacitors 572.1-572.5, 574.2-574.5, 576.1-576.5, 578.1-578.3 in which the input of every inverter of the intermediate delay chains 520-550 is connected by a pair of capacitors to an inverter of neighboring delay chains. As in the prior embodiments, it is not necessary that every node be connected in such a fashion. Other embodiments accommodate variation in which some predetermined fraction (again, half, one-third, one quarter, etc.) of the inverters are so connected to their neighbors.

During operation, as the CLK signal changes state, alternating rising and falling edges of the CLK signal may be input to the first delay chain 510. The rising and falling transitions may cause corresponding transitions at inputs of the remaining delay chains 520-550 through the interconnecting capacitors 572.1, 574.1, 576.1, 578.1. Thus, the first stage inverters 512.1, 522.1, 532.1, 542.1, 552.1 may transition at times that are offset from each other. Other interconnecting capacitors provided at later stages of the delay chains 510-550 also may contribute to maintenance of the phase offsets among the chains.

In a circuit implementation of FIG. 5, the delay lock loop (commonly, DLL) may be provided to the circuit 500 to ensure the total delay of one inverter string is one cycle of the LCK signal.

Figure 6:
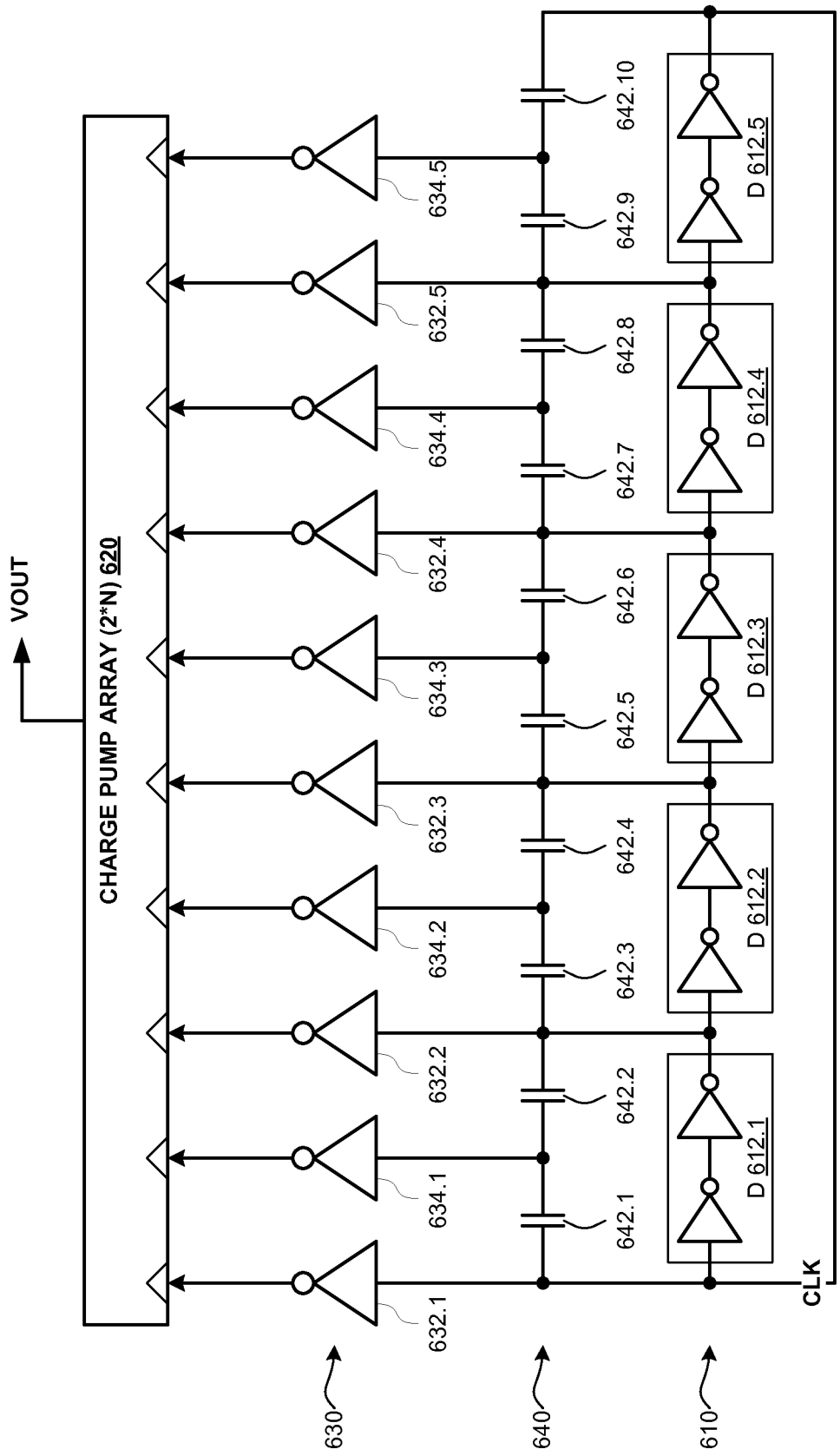
FIG. 6 illustrates a voltage generator according to yet another embodiment of the present invention.

FIG. 6 illustrates a voltage generator 600 according to another embodiment of the present invention. The voltage generator 600 may include a delay pipeline 610 having a plurality of N delay stages 612.1-612.5, a charge pump array 620 having twice the number (2*N) of charge pumps (not shown) as the stages in the delay pipeline 610, a plurality of trigger signal drivers 630 and a phase controller 640. The trigger driver 630 may have twice the number of trigger drivers 632.1-632.5, 634.1-634.5 as delay stages within the delay pipeline 610. A first set of the trigger drivers 632.1-632.5 may have inputs coupled to inputs and/or outputs of the delay stages 612.1-612.5 of the delay pipeline. A second number of trigger drivers 634.1-634.5 may have their inputs coupled to structures within the phase controller 640. In the example of FIG. 6, N=5.

The phase controller 640 may be provided as a cascaded series of phase control stages 642.1-642.10 having twice the number of stages as charge pumps in the charge pump array 620. The phase control stages 642.1-642.10 may be provided as a plurality of connected pairs (e.g., stages 642.1 and 642.2, stages 642.3 and 642.4, etc.) in which an intermediate node in each pair may be connected to an input of one of the second set of trigger drivers 634.1, 634.2, etc. External terminals of each pair (say, stages 642.1 and 642.2) may be connected respectively to input and output terminals of a common pipeline delay unit 612.1.

During operation, a clock signal CLK may propagate through the delay stages 612.1-612.5 of the delay pipeline 610. Consider an event where a voltage at the input of a given delay stage 612.2 initially is high but transitions low when a new phase of the CLK signal reaches it. Immediately prior to the falling transition, the voltage at the delay stage's 612.2 input and output both may be high. When a falling transition is input to the delay stage 612.2 from the preceding delay stage 612.1, the falling transition may be input also to the trigger driver 632.2 and to the capacitors 642.2 and 642.3. In response, the trigger driver 632.2 may change state, generating a rising transition on its output, which is provided to the charge pump array 620. The falling transition from delay stage 612.1 also may induce a charge redistribution event among capacitors 642.3 and 642.4, which may cause the trigger driver 634.2 to generate an output with a rising transition. Transitions of the outputs of the drivers 632.2 and 634.2 may have timing offsets with respect to each other based on delays introduced by the capacitors' 642.3, 642.4 response. Finally, in response to the falling transition and after a delay induced by components therein, the delay stage 612.2 may generate an output with a falling transition.

The falling transition may be output from the delay stage 612.2 to the next delay stage 612.3 in the delay pipeline 610, to the trigger driver 632.3 and to the capacitors 642.4 and 642.5 of the phase controller. The falling transition may induce a rising transition from the trigger driver 632.3. It also may induce another charge redistribution event in the capacitors 642.3 642.4 which may cause the trigger driver 634.2 to generate an output with a rising transition. This operation may cascade through the remaining delay stages 612.4, 612.5 of the delay pipeline 610.

In the embodiment illustrated in FIG. 6, the phase control stages 642.1-642.10 are illustrated as capacitors but the principles of the present invention find application to other circuit structures including resistors and inverters. Similarly, the trigger drivers 632.1-632.5, 634.1-634.5 are illustrated as inverters but the principles of the present invention also find application with non-inverting buffers.

FIG. 7 is a circuit diagram of a charge pump 700 according to an embodiment of the present invention. The charge pump 700 may be used as a charge pump stage in any of the voltage generators described hereinabove. The charge pump 700 may include a capacitor 710 and a pair of switches 720, 730. A first switch 720 may be connected to the capacitor 710 at a first terminal and may selectively connect the first terminal of the capacitor 710 to a reference voltage $V_{REF}$ (for example, supply voltage $V_{DD}$) or ground. The second switch 730 may be connected to the capacitor 710 at a second terminal and may connect the second terminal to a $V_{REF}$ terminal or to the $V_{OUT}$ output node. Both switches may be controlled by a trigger signal TRG.

During operation, when the TRG signal is at a first state (for example, TRG is low), switch 720 may connect the first terminal of the capacitor 710 to ground GND and switch 730 may connect the second terminal of the capacitor to the reference voltage $V_{REF}$. Thus, the capacitor 710 may capture a voltage $V_{REF}$. When the TRG signal transitions to a second state (TRG goes high), switch connections may change. The switch 720 may couple the first terminal of the capacitor 710 to the reference voltage $V_{REF}$ and the switch 730 may couple the second terminal of the capacitor 710 to the output terminal $V_{OUT}$. In response, the voltage at the output node $V_{OUT}$ may be boosted to approximately $2*V_{REF}$. Charge from the capacitor 710 may be injected to the output terminal $V_{OUT}$ in accordance with this voltage.

The charge pump 700 may be altered to provide a voltage lower than ground. Specifically, the switch 730 may toggle between ground and the output terminal $V_{OUT}$. In a first phase of operation, the TRG signal may cause switch 720 to connect the first terminal of the capacitor 710 to $V_{REF}$ and switch 730 may connect the second terminal of the capacitor to ground. Thus, the capacitor 710 may capture a voltage $-V_{REF}$. When the TRG signal transitions to a second state (TRG goes high), the switch 720 may couple the first terminal of the capacitor 710 to the ground GND and the switch 730 may couple the second terminal of the capacitor 710 to the output terminal $V_{OUT}$. In response, the voltage at the output node $V_{OUT}$ may be boosted to approximately $-V_{REF}$. Charge from the capacitor 710 may be drained from the output terminal $V_{OUT}$ in accordance with this voltage.

The preceding discussion has presented delay pipelines and charge pump arrays of fairly small sizes. In implementation, the number of delay pipelines, the number of delay stages and the number of charge pumps in an array may be far greater than illustrated. For example, in certain implementation, it may be convenient to provide systems having 24 delay pipelines with twenty-one delay stages therein, which lead to 504 charge pumps in an array. Other numbers of delay pipelines, delay stages and charge pumps may be selects for other circuit implementations as may be convenient for circuit designers.

Several embodiments of the invention are specifically illustrated and/or described herein. However, it will be appreciated that modifications and variations of the invention are covered by the above teachings and within the purview of the appended claims without departing from the spirit and intended scope of the invention.

We claim:

1. A voltage generator, comprising:
   plural sets of delay pipelines, each having a predetermined number of delay stages connected in series,
   a plurality of charge pumps, having triggering inputs each coupled to a respective delay stage, and
   a phase controller comprising a plurality of phase control stages interconnecting among the delay pipelines.

2. The voltage generator of claim 1, wherein interconnections of the phase control stages form a ring of connections among the delay pipelines.

3. The voltage generator of claim 1, wherein interconnections of the phase control stages form a web of connections among the delay pipelines.

4. The voltage generator of claim 1, wherein at least one phase control stage has a first terminal connected to a first delay pipeline at a first position therein and a second terminal connected to a second delay pipeline at a second position therein, different from the first position.

5. The voltage generator of claim 2, wherein other phase control stages have first terminals and second terminals connected to common positions within respective input and output delay pipelines.

6. The voltage generator of claim 1, wherein the delay pipelines are ring oscillators.

7. The voltage generator of claim 1, wherein the delay pipelines comprise a chain of inverters.

8. The voltage generator of claim 7,
   wherein the voltage generator has an input for an externally-supplied clock signal,
   wherein the voltage generator comprises an inverter having an input coupled to the input for the externally-supplied clock signal,
   wherein a first chain has an input coupled to the clock input for the externally-supplied clock signal, and
   wherein a second chain has an input coupled to an output of the inverter.

9. A voltage generator, comprising:
   an M×N array of charge pumps,
   a set of M delay pipelines, each having N stages therein, the stages of each pipeline respectively connected to different charge pumps from the M×N array, and
   means for offsetting outputs among the delay pipelines.

10. The voltage generator of claim 9, wherein the means for offsetting comprises a ring of delay elements connected among the delay pipelines.

11. The voltage generator of claim 9, wherein the means for offsetting comprises a web of delay elements connected among the delay pipelines.

12. The voltage generator of claim 9, wherein the means for offsetting comprises a plurality of inverters connected among the delay pipelines wherein at least one inverter has a first terminal connected to a first delay pipeline at a first position therein and a second terminal connected to a second delay pipeline at a second position therein, different from the first position.

13. The voltage generator of claim 9, wherein the means for offsetting comprises a plurality of resistors connected among the delay pipelines wherein at least one resistor has a first terminal connected to a first delay pipeline at a first position therein and a second terminal connected to a second delay pipeline at a second position therein, different from the first position.

14. The voltage generator of claim 9, wherein the means for offsetting comprises a plurality of capacitors connected among the delay pipelines wherein at least one capacitor has a first terminal connected to a first delay pipeline at a first position therein and a second terminal connected to a second delay pipeline at a second position therein, different from the first position.

15. The voltage generator of claim 9, wherein the delay pipelines are ring oscillators.

16. The voltage generator of claim 9, wherein the delay pipelines comprise respective chains of inverters.

17. The voltage generator of claim 9, wherein:
   the voltage generator has an input for an externally-supplied clock signal,
   the voltage generator comprises an inverter having an input coupled to the input for the externally-supplied clock signal,
   a first chain has an input coupled to the input for the externally-supplied clock signal, and
   a second chain has an input coupled to an output of the inverter.

18. A method of generating a voltage, comprising:
   generating a plurality of trigger signals in each of a plurality of parallel, multi-stage signal generation circuits,
   controlling operation of each parallel signal generation circuit of a stage to induce mutual offsets between the parallel signal generation circuits of the stage, and
   injecting charge to an output node in response to each of the trigger signals.

19. A voltage generator, comprising:
a predetermined number of charge pumps having outputs coupled to a common node,
a delay pipeline having a predetermined number of delay stages, a first set of intermediate nodes among the delay stages coupled to triggering inputs of a sub-set of the charge pumps,
a phase controller having a plurality of phase control stages coupled respectively between the first set of intermediate nodes of the delay pipeline, wherein a second set of intermediate nodes of the phase control stages are coupled to triggering inputs of another sub-set of the charge pumps.

20. The voltage generator of claim 19, wherein the delay pipeline is a ring oscillator.

21. The voltage generator of claim 19, wherein the delay pipeline comprises a chain of inverters.

22. The voltage generator of claim 19, wherein the phase control stages each comprise a pair of capacitors connected in series between an input terminal and output terminal of a common delay stage.

23. The voltage generator of claim 19, wherein the phase control stages each comprise a pair of resistors connected in series between an input terminal and output terminal of a common delay stage.

* * * * *